US012585804B2

(12) United States Patent
Wilczynski et al.

(10) Patent No.:  US 12,585,804 B2
(45) **Date of Patent:  \*Mar. 24, 2026**

(54) APPROACHES OF ENFORCING DATA SECURITY, COMPLIANCE, AND GOVERNANCE IN SHARED INFRASTRUCTURES

(71) Applicant: Palantir Technologies Inc., Denver, CO (US)

(72) Inventors: Peter Wilczynski, San Francisco, CA (US); Stephen Freiberg, Denver, CO (US)

(73) Assignee: Palantir Technologies Inc., Denver, CO (US)

(\*) Notice: Subject to any disclaimer, the term of this patent is extended or adjusted under 35 U.S.C. 154(b) by 91 days.

This patent is subject to a terminal disclaimer.

(21) Appl. No.: 18/762,600

(22) Filed: Jul. 2, 2024

(65) Prior Publication Data

US 2024/0354432 A1    Oct. 24, 2024

Related U.S. Application Data

(63) Continuation of application No. 17/374,648, filed on Jul. 13, 2021, now Pat. No. 12,026,267.

(60) Provisional application No. 63/128,000, filed on Dec. 18, 2020.

(51) Int. Cl.
| | |
|---|---|
| *H04L 29/06* | (2006.01) |
| *G06F 21/62* | (2013.01) |
| *H04L 9/40* | (2022.01) |

(52) U.S. Cl.
CPC ........ *G06F 21/6209* (2013.01); *H04L 63/105* (2013.01); *G06F 2221/2113* (2013.01)

(58) Field of Classification Search
None
See application file for complete search history.

(56) References Cited

U.S. PATENT DOCUMENTS

| | | | | |
|---|---|---|---|---|
| 8,869,299 | B2 * | 10/2014 | Charbonneau | .......... G06F 21/64 726/28 |
| 9,971,529 | B1 * | 5/2018 | LeCrone | ................. G06F 3/067 |
| 10,140,467 | B1 | 11/2018 | Xu et al. | |
| 10,152,384 | B1 * | 12/2018 | Amit | ................... G06F 11/1451 |
| 10,460,122 | B1 * | 10/2019 | Kirby | ................... H04L 63/101 |
| 11,080,422 | B2 | 8/2021 | Doyle et al. | |
| 2006/0224557 | A1 * | 10/2006 | Gupta | ................... G06F 16/958 |

(Continued)

OTHER PUBLICATIONS

Extended European Search Report for EP Appln. 21216146.7 dated Apr. 28, 2022, 10 pages.

(Continued)

*Primary Examiner* — Shin-Hon (Eric) Chen
(74) *Attorney, Agent, or Firm* — Sheppard Mullin Richter & Hampton LLP

(57) ABSTRACT

Systems and methods are provided for obtaining a request for a data object or a data structure from a client; determining an access level of the client and one or more access permissions of the requested data object or data structure; determining whether to transmit the requested data object or data structure to the client based on the access level of the client and the one or more access permissions; and transmitting the requested data object or data structure to the client.

20 Claims, 10 Drawing Sheets

(56)                    References Cited

U.S. PATENT DOCUMENTS

| | | | |
|---|---|---|---|
| 2010/0180337 A1* | 7/2010 | Bajekal | G06F 21/30 |
| | | | 726/19 |
| 2010/0180338 A1 | 7/2010 | Bajekal | |
| 2012/0240238 A1* | 9/2012 | Gates | H04N 21/41407 |
| | | | 726/26 |
| 2014/0047234 A1* | 2/2014 | Davis | G06Q 10/10 |
| | | | 713/160 |
| 2014/0268244 A1* | 9/2014 | Sheridan | G06Q 10/10 |
| | | | 358/403 |
| 2015/0195232 A1* | 7/2015 | Haugen | H04L 51/212 |
| | | | 709/206 |
| 2017/0257379 A1* | 9/2017 | Weintraub | H04L 63/107 |
| 2017/0300702 A1* | 10/2017 | Tegegne | G06F 21/6218 |
| 2021/0350026 A1 | 11/2021 | Doyle et al. | |

OTHER PUBLICATIONS

Non-Final Office Action dated Oct. 6, 2023, issued in related U.S. Appl. No. 17/374,648 (10 pages).

* cited by examiner

400

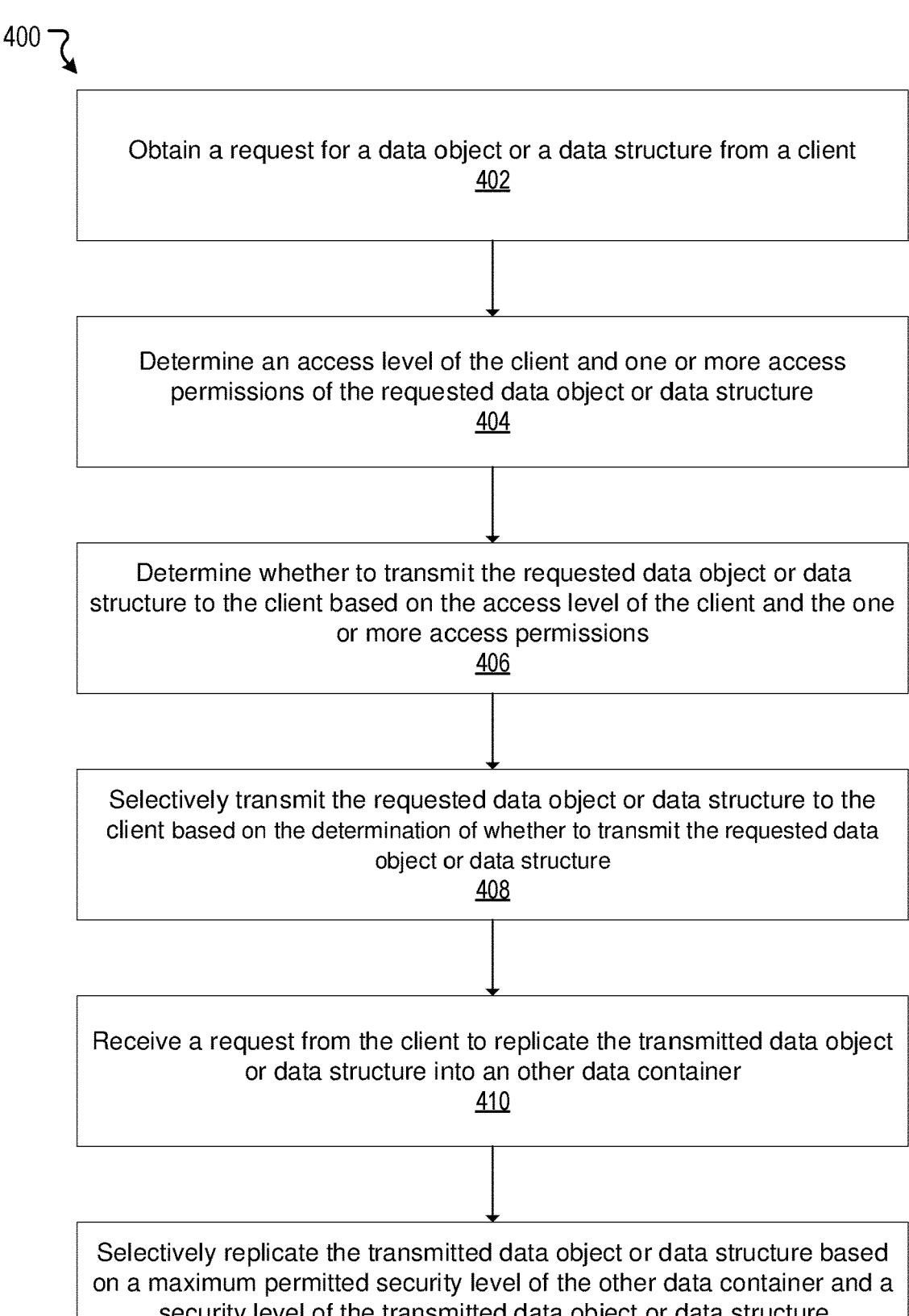

Obtain a request for a data object or a data structure from a client
402

Determine an access level of the client and one or more access permissions of the requested data object or data structure
404

Determine whether to transmit the requested data object or data structure to the client based on the access level of the client and the one or more access permissions
406

Selectively transmit the requested data object or data structure to the client based on the determination of whether to transmit the requested data object or data structure
408

Receive a request from the client to replicate the transmitted data object or data structure into an other data container
410

Selectively replicate the transmitted data object or data structure based on a maximum permitted security level of the other data container and a security level of the transmitted data object or data structure
412

| Processor(s)<br>504 | Network<br>Interface(s)<br>518 |

Bus
502

| Main<br>Memory<br>506 | ROM<br>508 | Storage<br>510 |

| Display<br>512 | Input<br>Device(s)<br>514 | Cursor<br>Control<br>516 |

APPROACHES OF ENFORCING DATA SECURITY, COMPLIANCE, AND GOVERNANCE IN SHARED INFRASTRUCTURES

CROSS REFERENCE TO RELATED APPLICATIONS

This application is a continuation of U.S. Non-Provisional application Ser. No. 17/374,648, filed Jul. 13, 2021, which claims priority under 35 U.S.C. § 119 (e) to U.S. Provisional Application No. 63/128,000, filed Dec. 18, 2020, which are hereby incorporated by reference in their entireties.

FIELD OF THE INVENTION

This disclosure relates to approaches of enforcing data security, compliance, and governance when at least some data reserved for different entities resides on a common physical infrastructure.

BACKGROUND

Conventional approaches of enforcing data security while data is accessed by multiple entities include implementing physical barriers between the data accessed by the multiple entities. In other words, separate infrastructure including software, hardware, and firmware may be used to store and control access to data by each of the entities. However, the aforementioned approach of physical barriers may be inadequate especially in today's increasingly collaborative environment, which requires efficient data exchange. Relying solely on physical barriers may detrimentally affect transmission efficiency, productivity, and usability, due to latencies and increased infrastructural requirements. Additionally, an ability to maintain security may nonetheless be compromised because isolated infrastructures may be limited in awareness of latest security threats and ability to adapt to those threats.

SUMMARY

Various embodiments of the present disclosure can include computing systems, methods, and non-transitory computer readable media configured to implement a security policy, for example, in an infrastructure that stores data in a common space to be accessed by multiple clients. The computing system, methods, and non-transitory computer readable media may perform: obtaining a request for a data object or a data structure from a client; determining an access level of the client and one or more access permissions of the requested data object or data structure; determining whether to transmit the requested data object or data structure to the client based on the access level of the client and the one or more access permissions; selectively transmitting the requested data object or data structure to the client based on the determination of whether to transmit the requested data object or data structure; in response to transmitting the requested data object or data structure to the client, receiving a request from the client to replicate the transmitted data object or data structure into an other data container; and selectively replicating the transmitted data object or data structure based on a maximum permitted security level of the other data container and a security level of the transmitted data object or data structure.

In some embodiments, the selective replication comprises: replicating the transmitted data object or data structure in response to the security level of the transmitted data object or data structure being within the maximum permitted security level of the other data container.

In some embodiments, in response to replicating the transmitted data object or data structure, setting a latency time during which the client is allowed to undo the replication.

In some embodiments, the determination of whether to transmit the requested data object or data structure to the client comprises determining that only a portion of the requested data object or data structure is to be transmitted; and the instructions further cause the system to perform: in response to determining that only a portion of the requested data object or data structure is to be transmitted, redacting a part of the requested data object or data structure so that only the portion remains; updating an ontology to match the portion of the requested data object or data structure; and transmitting the portion to the client.

In some embodiments, the instructions further cause the system to perform: selectively caching a portion of data received by the client at a client side, based on a security level of the portion of data; and setting a level of encryption on the cached portion of the data based on the security level of the portion of the data.

In some embodiments, the setting of the level of encryption comprises: determining whether the security level of the portion of the data exceeds a threshold security level; and in response to determining that the security level of the portion of the data exceeds a threshold security level, requiring the client to obtain an encryption key from the computing system in order to access the cached portion of the data.

In some embodiments, at least some of the multiple clients have different access privileges to the stored data.

These and other features of the computing system, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 4 illustrates a flowchart of an example method, in accordance with various embodiments of the present technology.

DETAILED DESCRIPTION

As data utilization has skyrocketed, relying on physical barriers in an attempt to prevent security breaches, leaks, or other unintended transmission among distinct databases has become infeasible. Increasingly, data that was previously stored separately is being stored in common spaces such as remote servers, including virtual machine (VM) servers and cloud servers implemented by common hardware infrastructure and software. One exemplary manifestation of such an integration of previously separated data is shown in multitenancy. However, security challenges arise because, for example, each of the distinct entities accessing the data has different security, compliance, and governance requirements, and a multitenancy arrangement increases a probability of unintended transmission of data to unauthorized entities.

To address security shortcomings that result from combining data of different entities into a common storage space, without compromising efficiency or increasing resource usage, a new approach is needed to implement security measures for each of different entities that are sharing a common storage space of data, while preventing unauthorized transmission of data among the different entities. A claimed solution rooted in computer technology overcomes problems specifically arising in the realm of computer technology. Using such a solution, clients may experience streamlined and seamless data exchange with airtight security, no matter if the clients are sharing a storage space with other clients or using their own storage space without sharing.

Figure 1A:
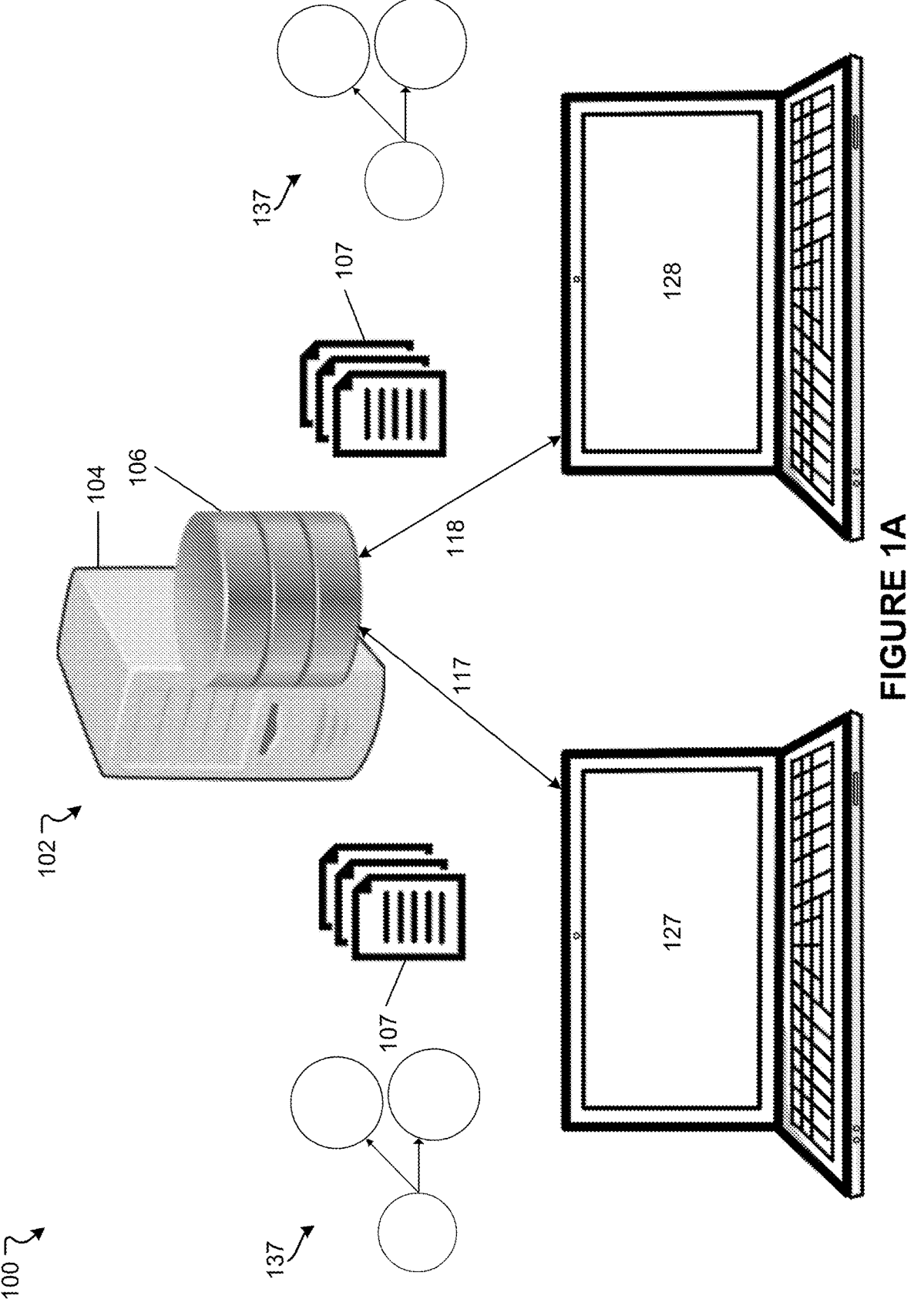
FIG. 1A illustrates an example computing environment, in accordance with various embodiments of the present technology.
Figure 1B:
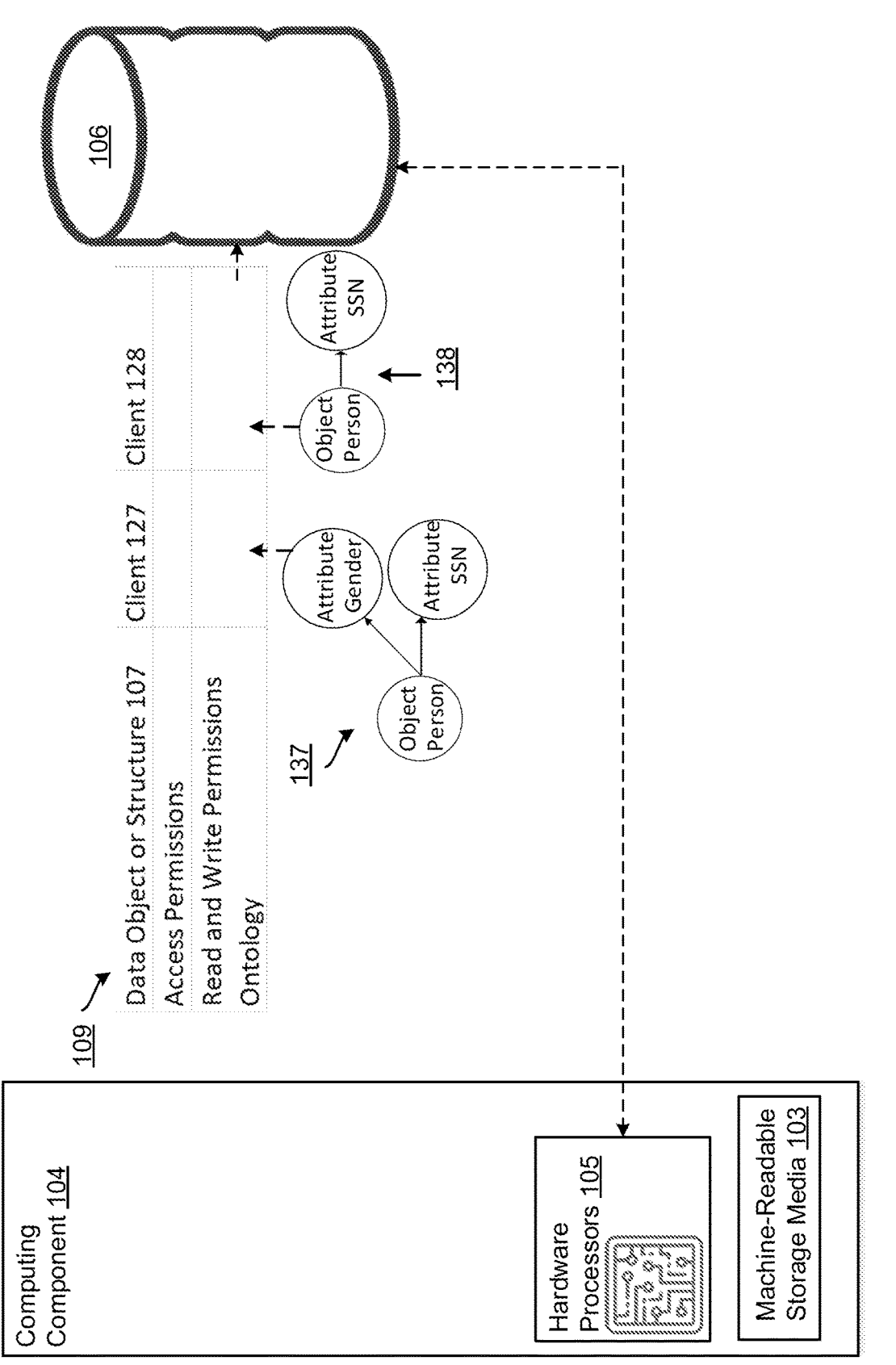
FIGS. 1B, 2A-2D, 3A and 3B illustrate exemplary implementations of a computing system, in accordance with various embodiments of the present technology.

FIG. 1A illustrates an example environment 100 and an exemplary implementation, in accordance with various embodiments, of a computing system 102 that includes a computing component 104 and a database or datastore (hereinafter "database") 106 that stores data, such as data object or structure 107, to be accessed by different clients 127 and 128 through data channels 117 and 118, respectively. In some embodiments, the computing system 102 may be a remote system. The computing system 102 may include a server such as a remote VM server or a cloud server. The data object or structure 107 may also contain an ontology mapping 137. The data stored in the database 106 may include any applicable type of data, include data objects or data structures. Just to name some examples, the data may be in a format of an append only log, a replicable data structure, a chat or other interactive system, a document, a spreadsheet, or other file. Although only two clients 127 and 128 are shown for purposes of simplicity, it is understood that additional clients may also access data from the common database 106. Additionally, although the clients 127 and 128 are shown as separate physical machines, the clients 127 and 128 may alternatively be manifested as different sessions or instances of a same physical machine. The computing component 104 may include one or more hardware processors 105 and machine-readable storage media 103, as shown in FIG. 1B, which store instructions to be executed by the one or more hardware processors 105.

The computing component 104 may, according to access control, security, compliance, and/or governance requirements or policies of each portion of data stored in the database 106, control a transmission of that portion of data to the clients 127 and 128. These requirements or policies may be inherent in metadata corresponding to each portion of data. The computing component 104 may further determine whether access privileges of each of the clients 127 and 128 permit transmission of that portion of data. The access privileges of the clients 127 and 128 may be defined in terms of a security level of data accessible by each of the clients 127 and 128, particular types or formats of data that are accessible, and/or particular requirements of ontology mappings associated with accessible data. In some embodiments, a subset of the requirements or policies may be stored as metadata embedded within each respective portion of data. Here, a subset is to be construed as encompassing either a portion or all the requirements or policies.

The computing component 104 may also determine whether the data object or structure 107 may be replicated into an other data container based on a comparison between a security level of the data object or structure 107 and a security level of the other data container. Here, a data container may encompass any suitable container, either physical or virtual, that stores data. For example, if the security level of the data object or structure 107 is equal to or lower than a maximum allowed security level defined by the other data container, the computing component 104 may determine that the data object or structure 107 may be replicated into the other data container. In some embodiments, the computing component 104 may, alternatively or additionally, determine whether the data object or structure 107 may be replicated into an other data container based on a type of the data object or structure 107 and a type of data permitted in the other data container. In some embodiments, the computing component 104 may, alternatively or additionally, determine whether the data object or structure 107 may be replicated into an other data container based on whether a client, such as the client 127 or the client 128, has rights or privileges to make such a replication.

In some embodiments, if the computing component 104 determines that the data object or structure 107 may not be replicated into the other data container, no portion of the data object or structure 107 may be replicated into the other data container due to the principle of atomicity.

FIG. 1B illustrates an exemplary implementation of components of the computing system described in FIG. 1A. In FIG. 1B, the database 106 may, in addition to storing data to be accessed by multiple clients such as the clients 127 and 128 of FIG. 1A, store metadata 109 of each transmittable and/or replicable portion of data, which may include access permissions, read and write permissions, and/or ontology mappings corresponding to accessible data of different clients (e.g., the clients 127 and 128). In some embodiments, the access permissions may identify or define whether each of the clients has access to that portion of data, a maximum frequency or number of times that portion of data may be accessed, and/or whether each of the clients has a right to transfer or replicate that portion of data to a different data container, assuming that portion of data has an equal or lower level of security compared to a maximum level of security permitted by the different data container. In some embodiments, the read and write permissions further define or identify whether each of the clients has a right to read and/or write to that portion of data, and an extent of that right. In some embodiments, the ontology mappings of each accessible portion of data may be determined based on access permissions of each of the clients. As only an exemplary illustration, the data object or structure 107 may include a "person" object, and attributes such as "gender" and personally identifiable information (PII) including a social security number ("SSN"), as indicated by the ontology mapping 137. The clients 127 and 128 of FIG. 1A may have full access to the data object or structure 107 based on their access permissions and/or on the security markings or settings of the data object or structure 107. However, if another client does not have full access to the data object or structure 107, but only a part of the data object or structure 107, an ontology mapping 138 corresponding to that part of the data object or structure 107 may differ from the ontology mapping 137. For example, if the other device does not have access to the PII, then the ontology mapping 138 may exclude the attribute "SSN" from the ontology mapping 137.

The computing component 104 may determine, from the metadata 109, access permissions to the data object or structure 107 of each client that may be requesting the data object or structure 107. If the computing component 104 determines that a client has only partial access to the data object or structure 107, the computing component 104 may redact or remove the inaccessible part while dynamically determining an adjusted ontology mapping of the remaining accessible part of the data object or structure 107. The computing component 104 may, in some embodiments, store the adjusted ontology mapping into the database 106 so that the adjusted ontology mapping may be accessed at a future time. In such a manner, the computing component 104 may efficiently transmit only an intended and accessible portion of data to each client while preventing unintended transmission of data. In a particular example of a chat or other interactive system between two clients 127 and 128, if the client 127 inputted additional data, the computing component may determine whether the client 128 has access privileges to the additional data before transmitting to the client 128.

The computing component 104 may update the access permissions based on changing classification levels, dissemination controls, and/or release controls of the data object or structure 107, changing access permissions of each client, and/or classification by aggregation or classification by compilation within the data object or structure 107. In some examples, classification by aggregation or classification by compilation may occur when two or more data resources, when integrated (e.g., aggregated, compiled, joined, or merged), have a higher classification level compared to when each of the resources exist individually. This higher classification level may stem from an additional association being revealed or inferred as a result of the resources being integrated. For example, this additional association may be between two entities, one of which is described in a first resource and another of which is described in a second resource, when the first resource and the second resource are integrated. Additionally, when two or more resources are integrated, other constraints such as dissemination controls or release controls may be different compared to when each of the resources exist individually. Herein, the two or more data resources may refer to existing data within the data object or structure 107 that is modified and/or combined with additional or new data, which may reveal or permit inference of an additional association. The computing component 104 may predict whether an additional association may be revealed or inferred as a result of a modification or a combination with additional or new data. This prediction may be based on a comparison of the ontology mapping 137 of the data object or structure 107, an ontology mapping associated with additional or new data, and/or modified data. For example, if the ontology mapping 137 of the data object or structure 107 is identical to the an ontology mapping associated with additional or new data, and/or modified data, the computing component 104 may predict that no additional association may be revealed or inferred. However, if the ontology mapping associated with additional or new data includes a same type of an object as in the ontology mapping 137, but includes a different object, then the computing component 104 may predict that an additional association may be revealed or inferred. For example, the ontology mapping associated with additional or new data may also include a person object of person "Y," but the ontology mapping 137 of the data object or structure 107 may only include a person object of person "X." The computing component 104 may then determine a resulting change, if any, of a classification level, dissemination control, and/or release control resulting from the predicted additional association. In some examples, the computing component 104 may receive an indication or a confirmation from a user, such as an administrator, regarding whether an additional association may be revealed or inferred, and/or a resulting change, if any, of a classification level, dissemination control, and/or release control.

Figure 2A:
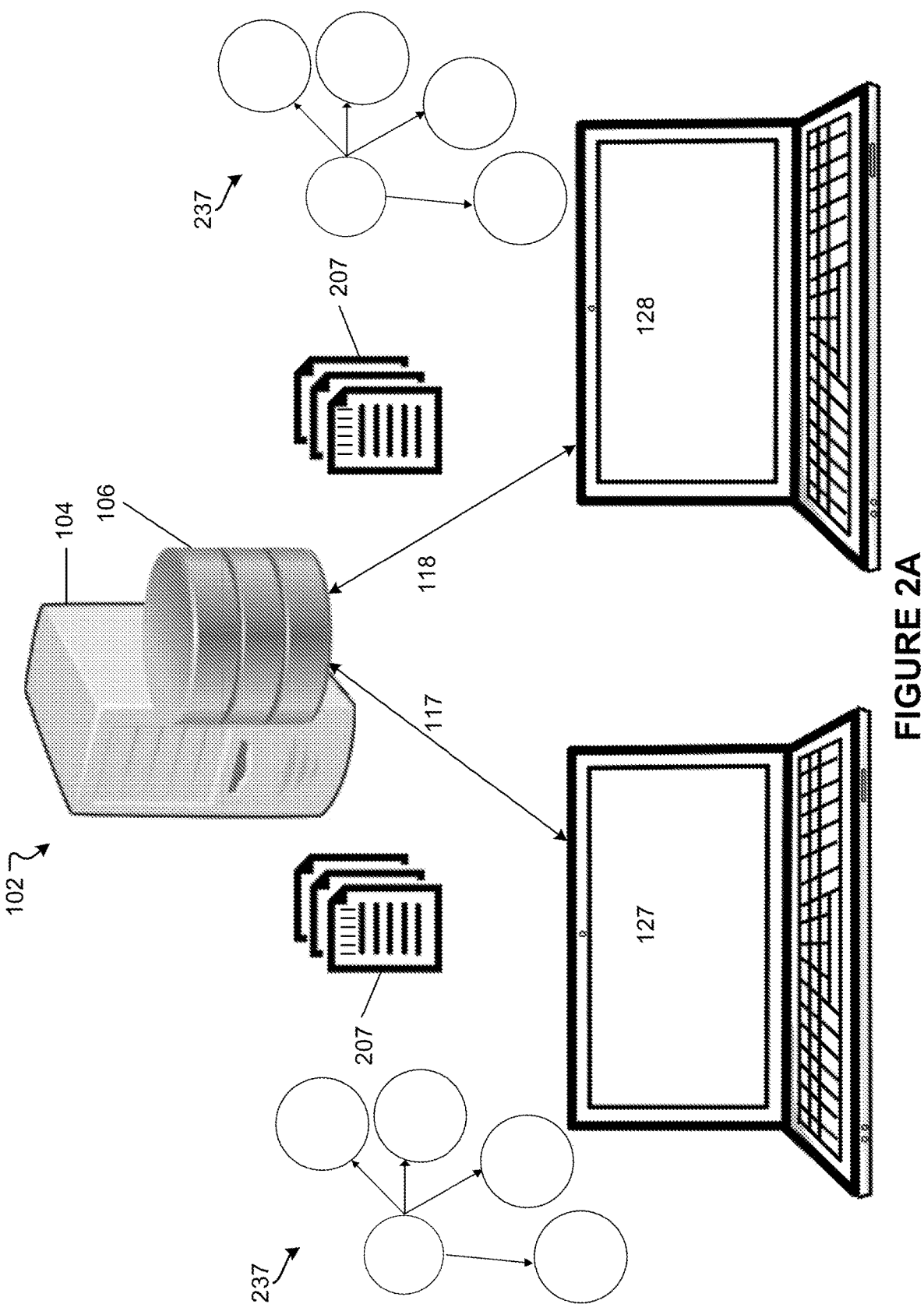

FIG. 2A illustrates an exemplary implementation, in accordance with various embodiments, of the computing system 102 described in reference to FIGS. 1A and 1B. Relevant principles described in FIGS. 1A and 1B may also be applied to FIG. 2A. In FIG. 2A, the data object or structure 107 from FIGS. 1A and 1B may have been modified into an updated data object or structure 207, for example, by another client. The computing component 104 of FIG. 2A may determine whether security settings and/or markings of the updated data object or structure 207 indicate that the updates in the data object or structure 207 are accessible by the clients 127 and 128. If the computing component 104 determines that the data object or structure 207 is accessible to the clients 127 and 128, then the computing component 104 may transmit the updated data object or structure 207 to the clients 127 and 128, along with an updated ontology mapping 237 corresponding to the updated data object or structure 207. The computing component 104 may transmit the corresponding updated ontology mapping 237 to the database 106. In alternative embodiments, the updated data object or structure 207 may have been modified by the client 127 instead of another client. The computing component 104 may then determine whether the client 128 has access to the updated data object or structure 207 using a same or similar procedure as described above.

The computing component 104 may also determine whether the updated data object or structure 207 can be replicated into an other data container in a same or similar manner as that described in reference to FIG. 1A. For example, if the updated data object or structure 207 has a security level lower than a maximum security level allowed by the other data container, the updated data object may be replicated into the other data container.

Figure 2B:
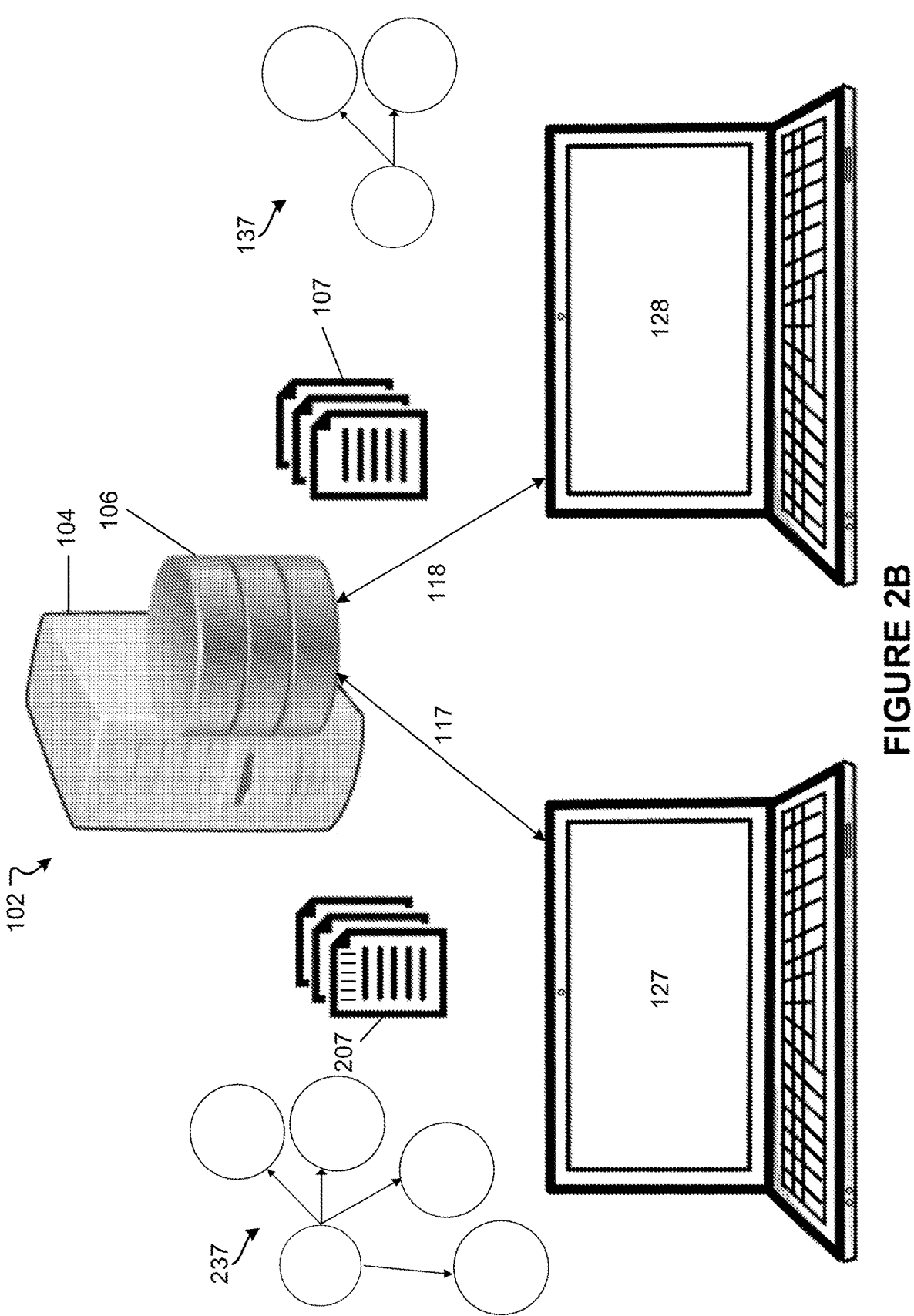

FIG. 2B illustrates an exemplary implementation, in accordance with various embodiments, of the computing system described in reference to FIGS. 1A and 1B. Relevant principles described in FIGS. 1A and 1B may also be applied to FIG. 2B. In FIG. 2B, the data object or structure 107 from FIGS. 1A and 1B may have been modified into an updated data object or structure 207, for example, by another client. The computing component 104 of FIG. 1A may determine whether security settings and/or markings of the updated data object or structure 207 indicate that the updates in the data object or structure 207 are accessible by the clients 127 and 128. In the exemplary implementation of FIG. 2B, the computing component 104 may determine that the security settings and/or markings of the updated data object or structure 207 indicate that the updates are accessible to the client 127 but inaccessible to the client 128. If so, then the computing component 104 may transmit the updated data object or structure 207 to the client 127, along with the updated ontology mapping 237 corresponding to the updated data object or structure 207. The computing component 104 may transmit the data object or structure 107 to the client 128, by either redacting or removing the updates in the updated data object or structure 207 or obtaining the data object or structure 107 prior to the updates. In some embodiments, if the client 128 already has the data object or structure 107, the computing component 104 may refrain from transmitting the data object or structure 107 to the client 128.

Figure 2C:
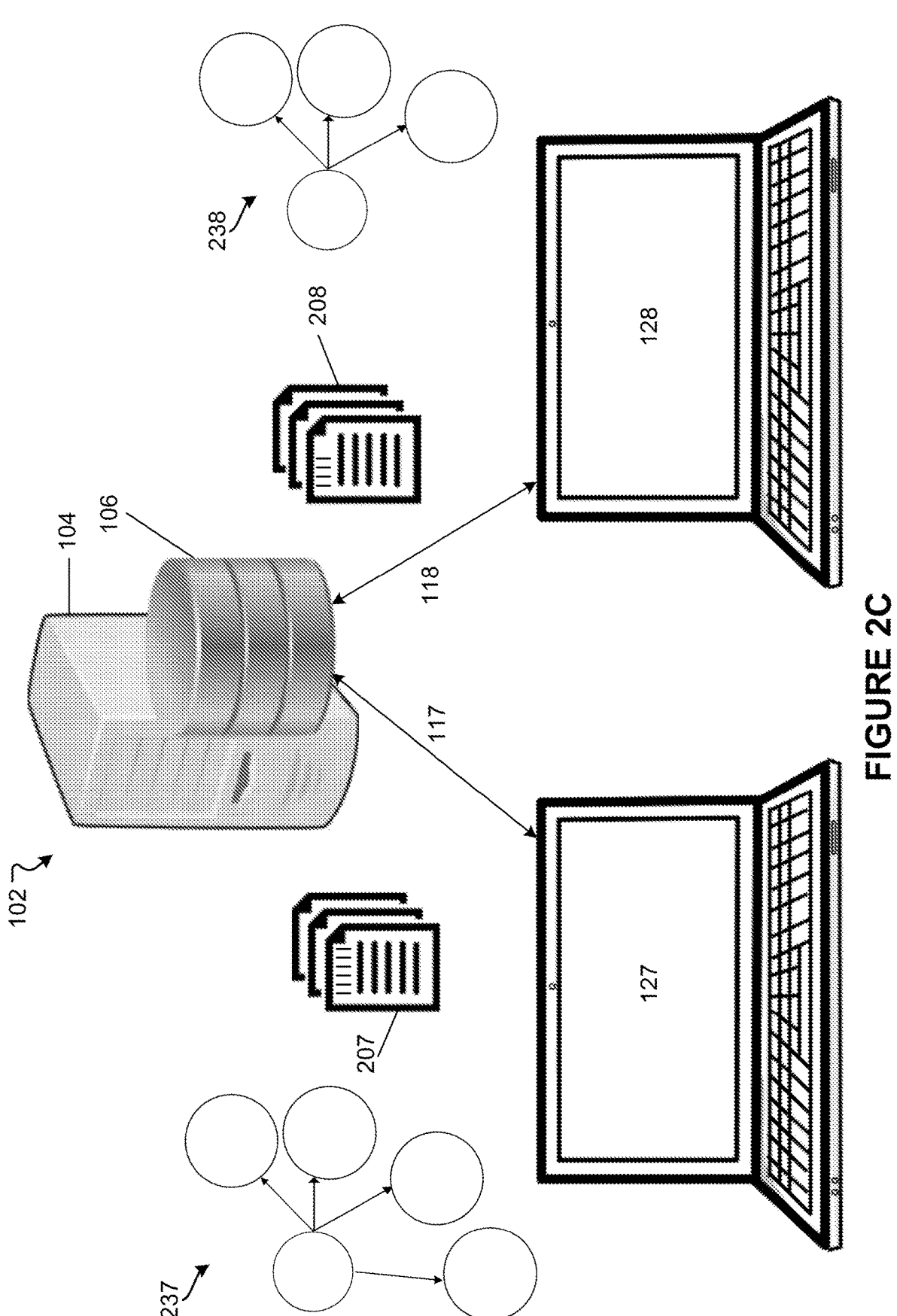

FIG. 2C illustrates an exemplary implementation, in accordance with various embodiments, of the computing system described in reference to FIGS. 1A and 1B. Relevant principles described in FIGS. 1A and 1B may also be applied to FIG. 2C. In FIG. 2C, the data object or structure 107 from FIGS. 1A and 1B may have been modified into an updated data object or structure 207, for example, by another client. The computing component 104 of FIG. 1A may determine whether security settings and/or markings of the updated data object or structure 207 indicate that the updates in the data object or structure 207 are accessible by the clients 127 and 128. In the exemplary implementation of FIG. 2C, the computing component 104 may determine that the security settings and/or markings of the updated data object or structure 207 indicate that the updates are accessible to the client 127 but only partially accessible to the client 128. If so, then the computing component 104 may transmit the updated data object or structure 207 to the client 127, along with the updated ontology mapping 237 corresponding to the updated data object or structure 207. The computing component 104 may transmit a second updated data object or structure 208 to the client 128, which includes only a part of the updates that are accessible to the client 128. The computing component 104 may redact an inaccessible part of the updated data object or structure 207 and determine a second updated ontology mapping 238 corresponding to the second updated data object or structure 208, prior to transmitting the second updated data object or structure 208 to the client 128.

Figure 2D:
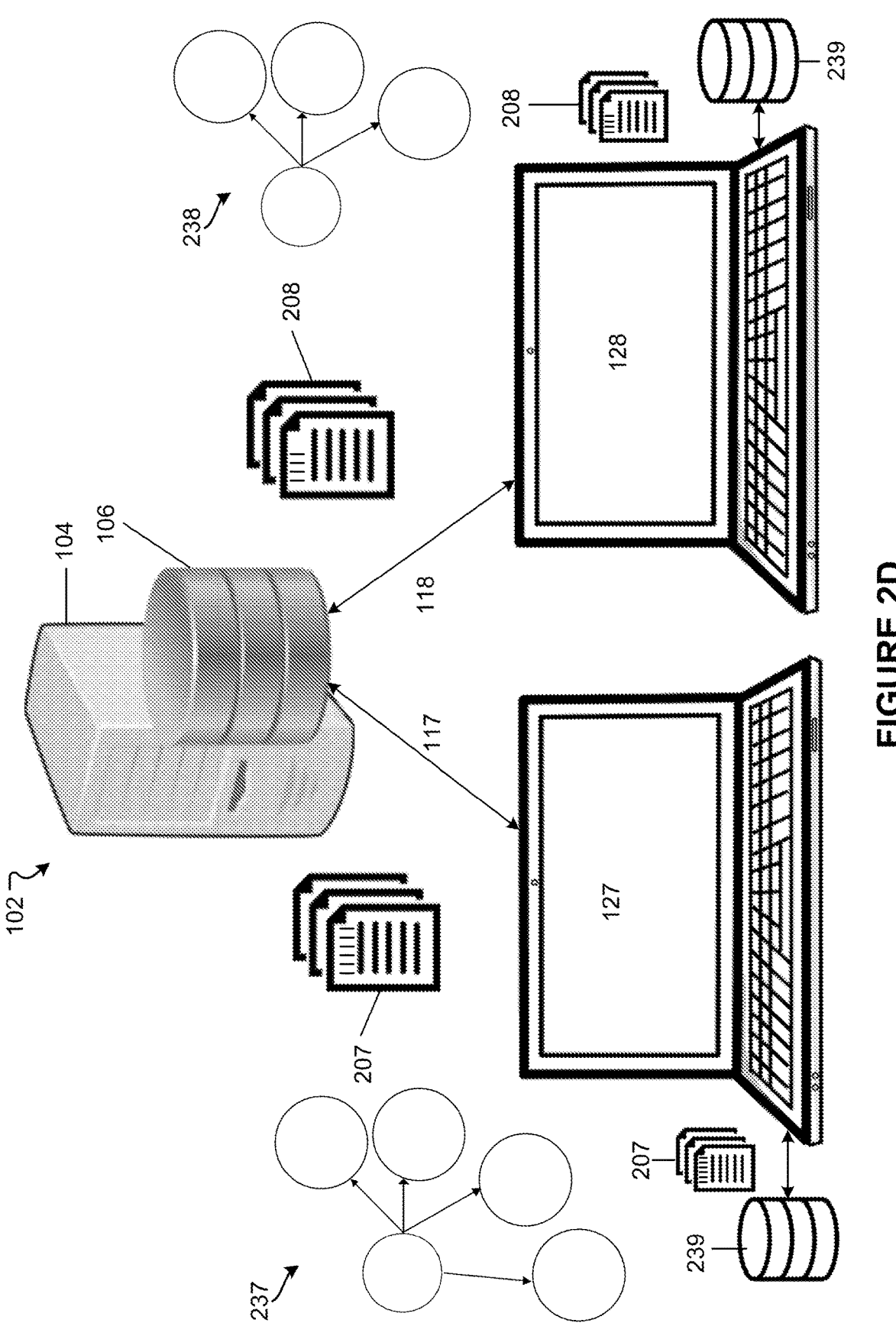

FIG. 2D illustrates an exemplary implementation, in accordance with various embodiments, of the computing system described in reference to FIGS. 1A, 1B, and 2C. Relevant principles described in FIGS. 1A and 1B may also be applied to FIG. 2D. In FIG. 2D, the client 127 may be attempting to replicate the updated data object or structure 207 into a data container 239. Criteria of determining whether the client 127 can replicate the updated data object or structure 207 may include criteria described in reference to FIG. 1A. The computing component 104 may determine whether a security level of the updated data object or structure 207 is equal to or lower than a maximum allowed security level of the data container 239. The computing component 104 may, additionally or alternatively, compare the ontology mapping 237 of the updated data object or structure 207 with permitted ontology mappings of the data container 239. If the computing component 104 determines that the security level of the updated data object or structure 207 is equal to or lower than the maximum allowed security level of the data container 239, the computing component 104 may permit the replication of the updated data object or structure 207 into the data container 239. Otherwise, the computing component 104 would not permit the replication of the updated data object or structure 207 into the data container 239. In some embodiments, the computing component 104 may set a lag time or add a latency of an attempted replication which defines an interval of time that the client 127 may undo an attempted replication. For example, such a latency or lag time would prevent unauthorized access to data from other clients accessing the data container 239 if the client 127 inadvertently attempted a replication into the data container 239. In such a manner, security during data replication may be enhanced.

The client 128 may be attempting to replicate the updated data object or structure 208 into the data container 239. The computing component 104 may determine whether or not to permit the replication of the updated data object or structure 208 into the data container 239 using an analogous procedure as described above.

Figure 3A:
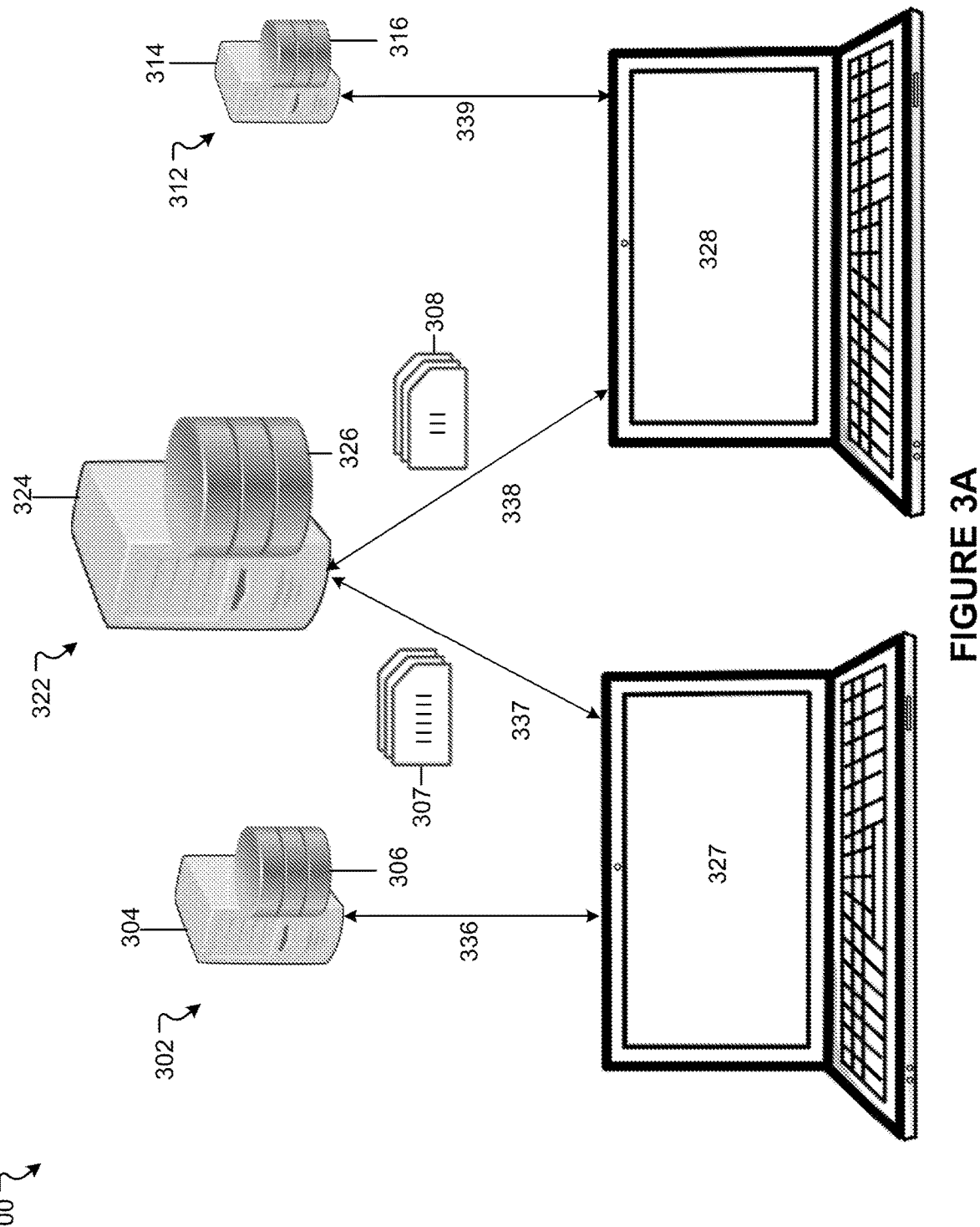

FIG. 3A illustrates an example environment 300 and an exemplary implementation, in accordance with various embodiments, of a configuration in which each client retrieves data from architecture that is at least partially separated from a data store of other clients, unlike in FIGS. 1A-1B and 2A-2D, in which the clients 127 and 128 share a common architecture of computing system 102. In FIG. 3, a computing system 302 includes a computing component 304 and a database or datastores (hereinafter "database") 306 that stores data, to be accessed by a client 327 through a data channel 336. The computing system 302 may be specific to the client 327 and not accessible or accessed by other clients. A computing system 312 includes a computing component 314 and a database or datastores (hereinafter "database") 316 that stores data, to be accessed by a client 328 through a data channel 339. The computing system 312 may be specific to the client 328 and not accessible or accessed by other clients. The clients 327 and 328 may also share a common architecture including a computing system 322. The computing system 322 includes a computing component 324 and a database or datastores (hereinafter "database") 326 that stores data, to be accessed by the clients 327 and 328 through data channels 337 and 338. The database 326 may store data that is at least partially accessible by both the clients 327 and 328. However, particular access permissions may differ for each portion of data between the client 327 and the client 328. For example, the client 327 may be able to fully access a part of a data object or structure, such as a data object or structure 307, but the client 328 may only be able to partially access that data object or structure, so the computing component 324 would redact or remove a part of that data object or structure that is not accessible. After redaction or removal, the data object or structure would be transformed into an updated data object or structure 308, before transmitting to the client 328. Same or similar principles as described with respect to the previous FIGS. 1A, 1B, and/or 2A-2D may be applicable to operations of the computing system 322.

Figure 3B:
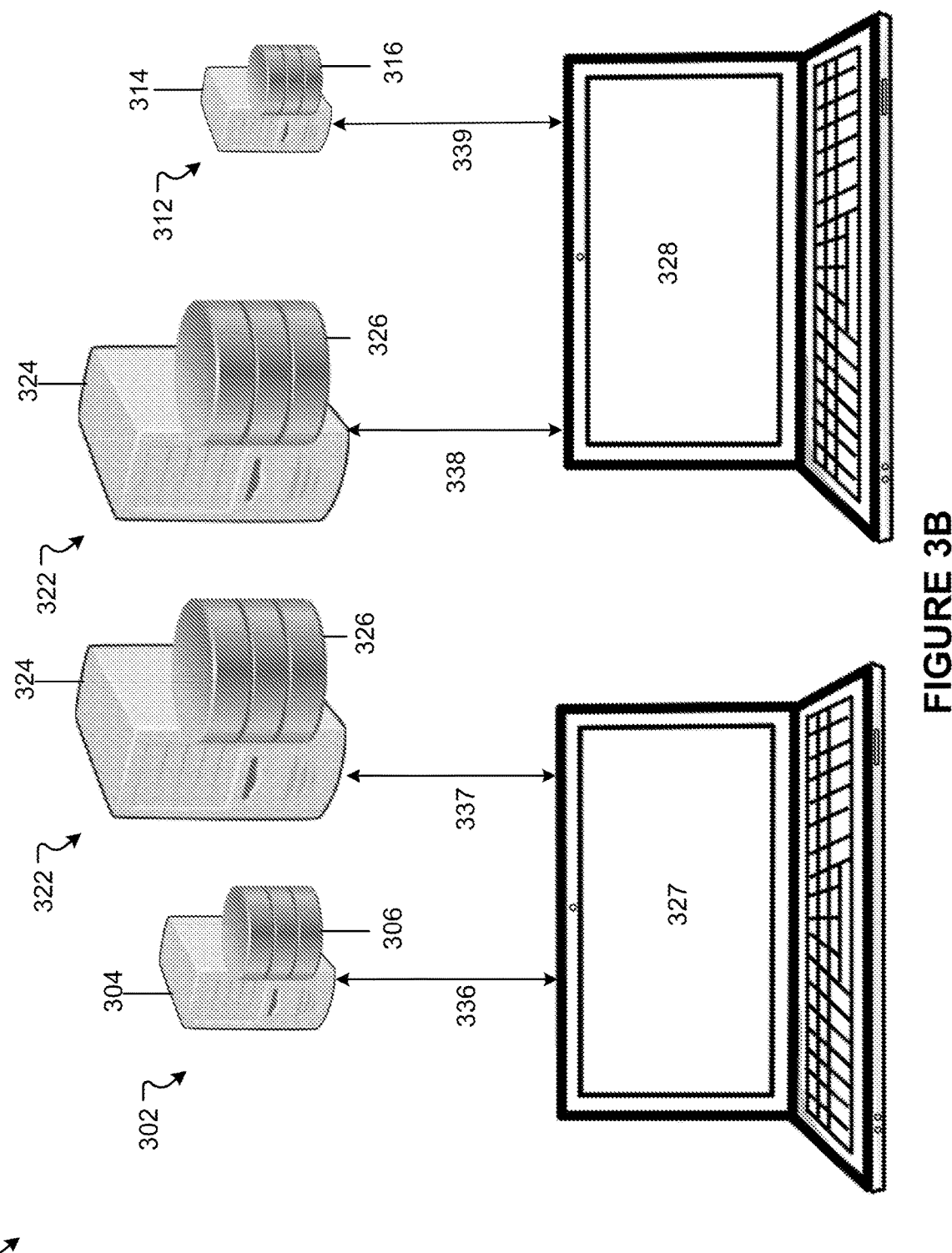

In some embodiments, the computing system 322 may be replicated so that the clients 327 and 328 may each have a physical replica of the computing system 322, as shown in FIG. 3B. In such a manner, an experience at the clients 327 and 328 would be the same regardless of whether the configuration of FIG. 3A or 3B is applied (e.g., whether clients 327 and 328 are sharing a common storage space).

At each of the clients 127, 128, 327, and/or 328 described in the previous FIGURES, data may be selectively cached. In some embodiments, a further security layer may include encryption of a subset of the cached data depending on a security level of each portion of the cached data. A level of encryption of a particular part of the data may depend on a security level of that particular part of the data. As an example, if the particular part of the data has a high security level, the level of encryption required may be strongest or most robust. In some examples, encryption keys may be required to access cached data. The encryption keys may be retrieved from a computing component where the cached data originated or previously came from. For example, the client 328 may request an encryption key at the computing component 322 to access a specific part of data cached at the client 328.

FIG. 4 illustrates a flowchart of an example method 400, according to various embodiments of the present disclosure. The method 400 may be implemented in various environments including, for example, the environments 100 of FIG. 1A and 300 in FIG. 3A or 3B. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At step 402, the computing component 104 of the computing system 102 may obtain a request for a data object or a data structure from a client. At step 404, the computing component 104 may determining an access level of the client and one or more access permissions of the requested data object or data structure. At step 406, the computing component 104 may determine whether to transmit the requested data object or data structure to the client based on the access level of the client and the one or more access permissions. At step 408, the computing component 104 may selectively transmit the requested data object or data structure to the client based on the determination of whether to transmit the requested data object or data structure. At step 410, the computing component 104 may, in response to transmitting the requested data object or data structure to the client, receive a request from the client to replicate the transmitted data object or data structure into an other data container. At step 412, the computing component 104 may selectively replicating the transmitted data object or data structure based on a maximum permitted security level of the other data container and a security level of the transmitted data object or data structure.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software. Operating systems control and schedule computer processes for execution, perform memory management, provide file system, networking, I/O services, and provide a user interface functionality, such as a graphical user interface ("GUI"), among other things.

Figure 5:
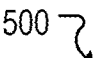
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts.

Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be removed, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment. A component being implemented as another component may be construed as the component being operated in a same or similar manner as the another component, and/or comprising same or similar features, characteristics, and parameters as the another component.

The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

The invention claimed is:

1. A computing system that stores data to be accessed by multiple clients, the computing system comprising:
   one or more processors; and
   memory storing instructions that, when executed by the one or more processors, cause the computing system to perform:
     obtaining a request for a data object or a data structure from a client, the data object or the data structure being stored within a first database associated with the computing system;
     determining an access level of the client and one or more access permissions of the requested data object or data structure;
     forming a first communication channel between the first database associated with the computing system and the client, the first communication channel regulating access to data according to the access level of the client and the first communication channel being configured to access the first database, the first database being accessed by a plurality of clients;
     determining whether to transmit the requested data object or data structure to the client based on the access level of the client and the one or more access permissions;
     selectively transmitting the requested data object or data structure, via the first communication channel, to the client based on the determination of whether to transmit the requested data object or data structure;
     in response to transmitting the requested data object or data structure to the client:
     setting a level of encryption on a portion of data corresponding to the transmitted requested data object or data structure based on the security level of the portion of the data, wherein the setting of the level of encryption comprises:
       determining whether the security level of the portion of the data exceeds a threshold security level; and
       in response to determining that the security level of the portion of the data exceeds a threshold security level, setting the level of encryption based on an encryption key to be retrieved from the computing system;
   receiving a request from the client to replicate the transmitted data object or data structure into an other data container;
   in response to receiving the request, selectively replicating the transmitted data object or data structure based on a permitted security level of the other data container and a security level of the transmitted data object or data structure;
   receiving an update to the requested data object or data structure, a change in the access level of the client or a change in the one or more access permissions; and
   selectively transmitting the update to the requested data object or data structure, the change in the access level of the client or the change in the one or more access permissions to the client based on a security level of the update.

2. The computing system of claim 1,
   wherein the selective replication comprises replicating the transmitted data object or data structure in response to the security level of the transmitted data object or data structure being within the maximum permitted security level of the other data container.

3. The computing system of claim 2, wherein the instructions further cause the system to perform:
   in response to replicating the transmitted data object or data structure, setting a latency time during which the client is allowed to undo the replication.

4. The computing system of claim 1, wherein the determination of whether to transmit the requested data object or data structure to the client comprises determining that only a portion of the requested data object or data structure is to be transmitted; and the instructions further cause the system to perform:
   in response to determining that only a portion of the requested data object or data structure is to be transmitted, redacting a part of the requested data object or data structure so that only the portion remains;
   updating an ontology to match the portion of the requested data object or data structure; and
   transmitting the portion to the client.

5. The computing system of claim 1, wherein the client comprises a session or an instance of a particular physical machine.

6. The computing system of claim 5, wherein the particular physical machine is shared with a different session or a different instance.

7. The computing system of claim 1, wherein at least some of the plurality of clients have different access privileges to the stored data.

8. A computer-implemented method of a computing system that stores data to be accessed by one or more clients, wherein the method is performed using one or more processors, the method comprising:
   obtaining a request for a data object or a data structure from a client, the data object or the data structure being stored within a first database associated with the computing system;

determining an access level of the client and one or more access permissions of the requested data object or data structure;

forming a first communication channel between the first database associated with the computing system and the client, the first communication channel regulating access to data according to the access level of the client and the first communication channel being configured to access the first database, the first database being accessed by a plurality of clients;

determining whether to transmit the requested data object or data structure to the client based on the access level of the client and the one or more access permissions;

selectively transmitting the requested data object or data structure, via the first communication channel, to the client based on the determination of whether to transmit the requested data object or data structure;

in response to transmitting the requested data object or data structure to the client:

setting a level of encryption on a portion of data corresponding to the transmitted requested data object or data structure based on the security level of the portion of the data, wherein the setting of the level of encryption comprises:

determining whether the security level of the portion of the data exceeds a threshold security level; and in response to determining that the security level of the portion of the data exceeds a threshold security level, setting the level of encryption based on an encryption key to be retrieved from the computing system;

receiving a request from the client to replicate the transmitted data object or data structure into an other data container;

in response to receiving the request, selectively replicating the transmitted data object or data structure based on a permitted security level of the other data container and a security level of the transmitted data object or data structure;

receiving an update to the requested data object or data structure, a change in the access level of the client or a change in the one or more access permissions; and selectively transmitting the update to the requested data object or data structure, the change in the access level of the client or the change in the one or more access permissions to the client based on a security level of the update.

9. The computer-implemented method of claim 8, wherein the selective replication comprises replicating the transmitted data object or data structure in response to the security level of the transmitted data object or data structure being within the maximum permitted security level of the other data container.

10. The computer-implemented method of claim 9, further comprising:

in response to replicating the transmitted data object or data structure, setting a latency time during which the client is allowed to undo the replication.

11. The computer-implemented method of claim 8, wherein the determination of whether to transmit the requested data object or data structure to the client comprises determining that only a portion of the requested data object or data structure is to be transmitted; and the instructions further cause the system to perform:

in response to determining that only a portion of the requested data object or data structure is to be transmitted, redacting a part of the requested data object or data structure so that only the portion remains;

updating an ontology to match the portion of the requested data object or data structure; and transmitting the portion to the client.

12. The computer-implemented method of claim 8, wherein the client comprises a session or an instance of a particular physical machine.

13. The computer-implemented method of claim 12, wherein the particular physical machine is shared with a different session or a different instance.

14. The computer-implemented method of claim 8, wherein at least some of the multiple clients have different access privileges to the stored data.

15. A non-transitory computer readable medium comprising instructions that, when executed, cause one or more processors to perform:

obtaining a request for a data object or a data structure from a client, the data object or the data structure being stored within a first database associated with the computing system;

determining an access level of the client and one or more access permissions of the requested data object or data structure;

forming a first communication channel between the first database associated with the computing system and the client, the first communication channel regulating access to data according to the access level of the client and the first communication channel being configured to access the first database, the first database being accessed by a plurality of clients;

determining whether to transmit the requested data object or data structure to the client based on the access level of the client and the one or more access permissions;

selectively transmitting the requested data object or data structure, via the first communication channel, to the client based on the determination of whether to transmit the requested data object or data structure;

in response to transmitting the requested data object or data structure to the client:

setting a level of encryption on a portion of data corresponding to the transmitted requested data object or data structure based on the security level of the portion of the data, wherein the setting of the level of encryption comprises:

determining whether the security level of the portion of the data exceeds a threshold security level; and in response to determining that the security level of the portion of the data exceeds a threshold security level, setting the level of encryption based on an encryption key to be retrieved from the computing system;

receiving a request from the client to replicate the transmitted data object or data structure into an other data container;

in response to receiving the request, selectively replicating the transmitted data object or data structure based on a permitted security level of the other data container and a security level of the transmitted data object or data structure;

receiving an update to the requested data object or data structure, a change in the access level of the client or a change in the one or more access permissions; and selectively transmitting the update to the requested data object or data structure, the change in the access level of the client or the change in the one or more access permissions to the client based on a security level of the update.

16. The non-transitory computer readable medium of claim 15, wherein the selective replication comprises replicating the transmitted data object or data structure in response to the security level of the transmitted data object or data structure being within the maximum permitted security level of the other data container.

17. The non-transitory computer readable medium of claim 16, wherein the instructions further cause the one or more processors to perform:

in response to replicating the transmitted data object or data structure, setting a latency time during which the client is allowed to undo the replication.

18. The non-transitory computer readable medium of claim 15, wherein the determination of whether to transmit the requested data object or data structure to the client comprises determining that only a portion of the requested data object or data structure is to be transmitted; and the instructions further cause the system to perform:

in response to determining that only a portion of the requested data object or data structure is to be transmitted, redacting a part of the requested data object or data structure so that only the portion remains;

updating an ontology to match the portion of the requested data object or data structure; and transmitting the portion to the client.

19. The non-transitory computer readable medium of claim 15, wherein the client comprises a session or an instance of a particular physical machine.

20. The non-transitory computer readable medium of claim 19, wherein the particular physical machine is shared with a different session or a different instance.

* * * * *